United States Patent [19]

Peyton

[11] Patent Number: 4,556,077

[45] Date of Patent: Dec. 3, 1985

[54] SWITCHING VALVE FOR A FUEL SUPPLY SYSTEM

[75] Inventor: Richard H. Peyton, Berkley, Mass.

[73] Assignee: Allied Corporation, Morristown, N.J.

[21] Appl. No.: 563,423

[22] Filed: Dec. 20, 1983

[51] Int. Cl.[4] .......... F16K 11/02

[52] U.S. Cl. .......... 137/112; 137/119; 137/266; 137/625.5; 123/514

[58] Field of Search .......... 137/112, 119, 109, 266, 137/267, 567, 625.5; 123/514

[56] References Cited

U.S. PATENT DOCUMENTS

| | | | |
|---|---|---|---|
| 1,180,826 | 4/1916 | Carson . | |
| 1,189,096 | 6/1916 | Grunwald . | |
| 2,599,699 | 6/1952 | Dilworth et al. | 158/36.8 |
| 2,821,972 | 2/1958 | Banker | 123/127 |
| 3,592,215 | 7/1971 | Davis | 137/112 |
| 3,924,651 | 12/1975 | Hippel et al. | 137/625.5 |
| 4,111,230 | 9/1978 | Stampfli | 137/625.5 |
| 4,312,372 | 1/1982 | Amos et al. | 137/266 |
| 4,320,734 | 3/1982 | Balachandran | 123/510 |
| 4,343,283 | 8/1982 | Shepherd | 123/557 |

FOREIGN PATENT DOCUMENTS

| | | |
|---|---|---|
| 825946 | 12/1959 | United Kingdom . |
| 1021236 | 3/1966 | United Kingdom . |
| 1174143 | 12/1969 | United Kingdom . |
| 1233647 | 5/1971 | United Kingdom . |
| 1383842 | 2/1975 | United Kingdom . |
| 2004030 | 3/1979 | United Kingdom . |

*Primary Examiner*—Martin P. Schwadron
*Assistant Examiner*—James R. Shay
*Attorney, Agent, or Firm*—Ken C. Decker; William N. Antonis

[57] ABSTRACT

A valve mechanism for a dual tank fuel supply system includes a housing (304) communicated to the return circuit (118, 218) and supply circuit (116, 216). The valve mechanism is responsive to pressure differentials between branches (170, 172 and 270, 272) of the supply circuit (216) to switch communication between branches (178, 180, 278, 280) of the return circuit (118, 218) accordingly.

9 Claims, 4 Drawing Figures

SWITCHING VALVE FOR A FUEL SUPPLY SYSTEM

This invention relates to a switching valve used in a fuel supply system for a vehicle engine. Vehicle engines equipped with carburetors have a fuel float level switch and bowl containing a quantity of fuel at all times to assure a constant flow of fuel to the vehicle engine, even though the fuel pickup in the vehicle fuel tank comes out of the fuel, due to movement of the fuel in the tank when the vehicle travels on grades or when the vehicle turns. However, electronic fuel injection systems have become increasingly popular on vehicle engines. Engines equipped with electronic fuel injection systems have no bowl or float; accordingly, when the fuel pickup comes out of the fuel in the fuel tank, the pickup draws air into the system causing the engine to stall. Furthermore, many of these fuel-injected engines are equipped with recirculating fuel systems in which a quantity of fuel must be returned from the engine to the fuel tank One prior art system presently used on fuel-injected engines uses baffles within the fuel tank to maintain fuel in the portion of the tank with which the pickup communicates. However, this baffle system is relatively complex and very costly, due to the complicated construction that is necessary.

The situation is made still more complicated by the fact that many vehicles, such as commercial vehicles, which use fuel-injection systems are equipped with dual fuel tanks. Obviously, it is necessary in recirculating-type fuel-injection systems that the fuel be returned to the same tank from which fuel is being taken for use by the engine. If any appreciable quantity of fuel is returned to the wrong tank, it is possible that the tank would overflow, with possibly dangerous consequences.

The present invention provides a switching valve as a part of a filter/reservoir system. The switching valve is responsive to fuel flow from either of the tanks in a dual tank fuel system to assure that communication through the fuel return line is communicated to the same tank from which fuel is being taken. The invention provides an appropriate, low-cost switching valve which is responsive to fuel communication into the filter/reservoir to assure that fuel in the return line is being returned to the same fuel tank from which fuel is being taken.

Other features and advantages of the invention will become apparent from the following description with reference to the accompanying drawings, in which FIG. 1 is a schematic illustration of a vehicle fuel supply system with a filter/reservoir made pursuant to the teachings of the present invention;

Figure 1:
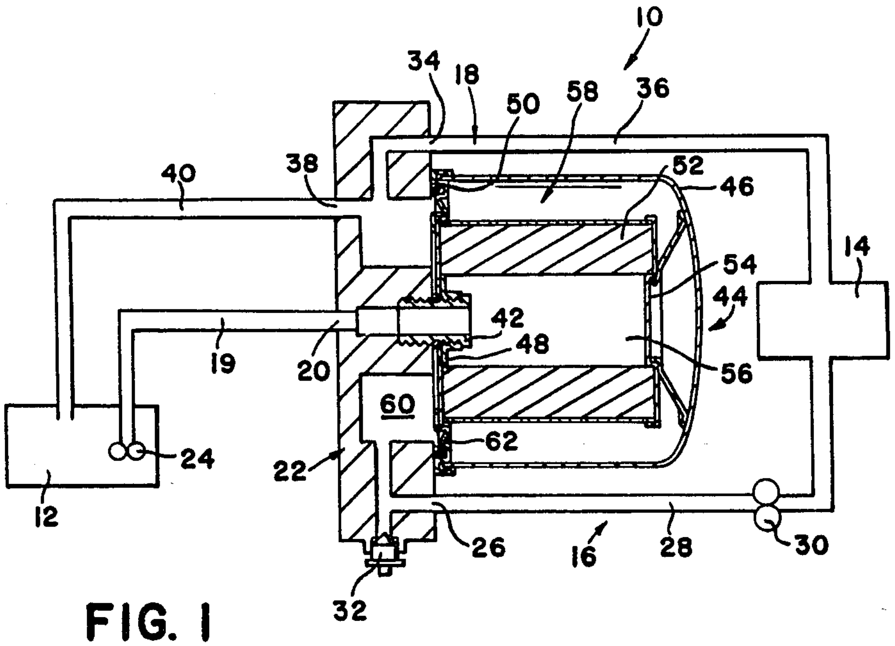

Referring now to FIG. 1, a single-tank fuel supply system generally indicated by the numeral 10 supplies fuel from a fuel tank 12 to a vehicle engine 14. The fuel supply system 10 includes a primary or a supply circuit generally indicated by the numeral 16 and a secondary or return circuit generally indicated by the numeral 18. The fuel supply circuit 16 includes a first portion 19 that communicates fuel in the tank 12 to the inlet 20 of a filter/reservoir housing 22. A pump indicated schematically as at 24 is located in the tank 12 and forces fuel through the supply circuit 16. The housing 22 includes an outlet port 26 which communicates with a second portion 28 of the fuel supply circuit 16 which communicates with the inlet or low pressure side of a high pressure transfer pump 30, the outlet of which is communicated with the injectors (not shown) on the engine 14. A system drain is provided as at 32 to permit fuel to be drained from the housing 22. As will become apparent hereinafter, the fuel flow capacity of the pump 24 must be greater than the fuel flow capacity of the transfer pump 30, so that the rate of fuel flow in the portion 19 of the primary or fuel supply circuit 16 is greater than the flow rate in the portion 28 thereof.

Housing 22 further includes another inlet port 34 which communicates with portion 36 of the fuel return circuit 18 which connects the engine 14 with the housing 22. Another outlet port 38 connects the housing 22 with portion 40 of the return circuit 18 which communicates the housing 22 with the fuel tank 12.

The housing 22 is provided with an externally-threaded stem 42 which is adapted to receive a spin-on filter cartridge generally indicated by the numeral 44. The spin-on cartridge 44 includes a hollow canister 46 having an open end which is closed by a tapping plate 48. Tapping plate 48 is provided with a threaded opening which can be screwed onto the threaded stem 42. A circumferentially extending seal 50 is carried on the tapping plate 48 and engages a portion of the housing 22 to provide a fluid-tight connection between the cartridge 44 and the housing 22. A conventional filtering medium generally indicated by the numeral 52 comprising a circumferentially extending array of radially tapering pleats of filter paper is mounted on the tapping plate 48 in a conventional manner. A closed end cap 54 closes the end of the filtering medium 52 to divide the interior of the canister 46 into an inlet chamber 56 on the upstream side of the filtering medium 52 and an outlet chamber 58 on the downstream side of the filtering medium 52. Inlet chamber 56 is communicated with inlet port 20, and outlet chamber 58 is communicated with a circumferentially extending cavity 60 defined within the housing 22 through circumferentially spaced openings 62 in the tapping plate 48. The cavity 60, and therefore the outlet chamber 58, are communicated with the ports 26, 34, and 38 on the housing 22 and with the drain 32.

In operation, and as discussed above, the flow rate produced by the pump 24 in the tank 12 is greater than the flow rate of the transfer pump 30. Accordingly, the rate of fuel flow through portion 19 of the primary or fuel supply circuit 16 is greater than the flow rate through the portion 28 thereof. This differential in flow rate fills the inlet chamber 56, the outlet chamber 58 and the cavity 60. After chambers 56, 58 and cavity 60 are filled, the excess fuel being pumped into the inlet port 20 of housing 22 is mixed with the fuel being returned to the port 34 through the portion 36 of the fuel return circuit 18. This mixing takes place in the cavity 60, and the fuel is then returned to the tank 12 through portion 40 of return circuit 18. Accordingly, the flow rate of fuel through the portion 40 exceeds that in the portion 36 of return circuit 18 by the difference in the rate of fuel flow in the portion 19 of primary or fuel supply circuit 16 over that in the portion 28 thereof when the housing 22 and cartridge 44 are full of fuel. Because of the excess flow that is being returned directly to fuel tank 12 without flowing to the engine 14, none of the fuel being returned through the portion 36 of the return circuit 18 can be mixed with flow from the tank 12 being communicated to the engine through the portion 28 of fuel supply circuit 16 during normal conditions. However, when the pickup (not shown) in tank 12 comes out of the fuel level due to, for example, the vehicle turning or climbing a grade, the quantity of fuel contained within the canister 44 and housing 22, and the fuel being returned through the portion 36 of the return circuit 18, can be used to supply the transfer pump 30 so that the engine 14 will not stall.

Figure 2:
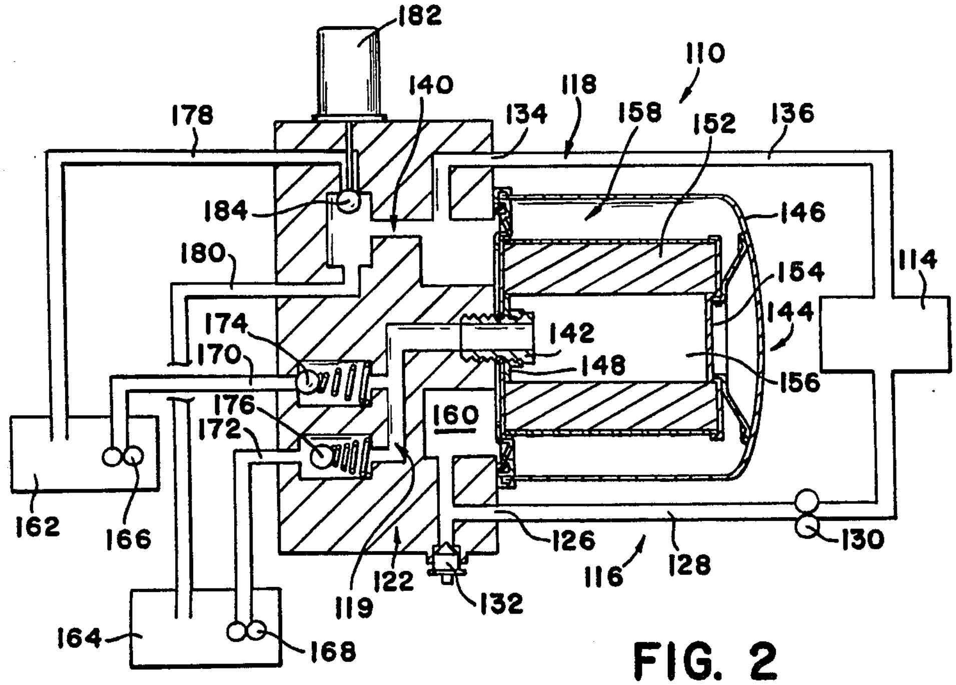
FIG. 2 is a view similar to that of FIG. 1 but illustrating the filter/reservoir of the present invention in a two-tank fuel supply system along with one embodiment of a fuel control valve.

Referring now to the embodiment of FIG. 2, elements the same or substantially the same as those in the embodiment of FIG. 1 retain the same reference numeral, but preceded by the numeral 1. Referring to FIG. 2, the fuel tank 12 of FIG. 1 is replaced by dual fuel tanks 162, 164, each of which is equipped with a corresponding pump 166, 168 which are both similar to the pump 24 of FIG. 1. Accordingly, the portion 119 of the primary or fuel supply circuit 116 is divided into branches 170, 172 which communicate with the tanks 166, 168 respectively. A pair of check valves 174, 176 select the higher of the fluid pressure levels in branches 170, 172 for communication into the inlet chamber 156 of the housing 122. Since the vehicle is equipped with a circuit (not shown) that actuates the pumps 166, 168, depending upon the fuel tank 162 or 164 from which fuel is being taken, only the branch 170 or 172 which is communicated with the tank containing the pump which is actuated will be able to communicate into the inlet chamber 156. Similarly, the portion 140 of the secondary or return circuit 118 is divided into branches 178, 180 which communicate respectively with the tanks 162, 164. A solenoid actuator 182 is connected to the vehicle's electric circuit which controls the pumps 166, 168. The actuator 182 controls the position of valve member 184 to permit communication through the branch 178 or 180, depending upon which pump 166 or 168 is energized. Accordingly, it will be appreciated that the check valves 174, 176 select fuel from one of the tanks 162, 164 for communication through the system and that the solenoid actuator 182 positions the valve member 184 to assure that fuel being returned from the engine 114 is returned to the same tank from which fuel is being drawn.

Figure 3:
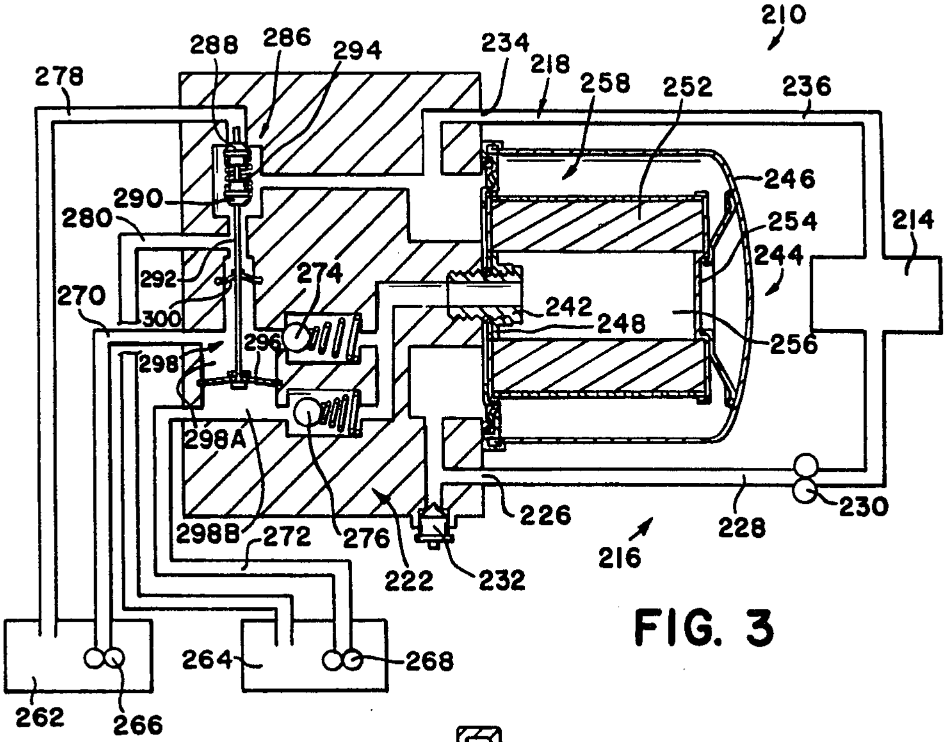
FIG. 3 is a view similar to FIG. 2 but illustrating a different embodiment of the fuel control valve used in FIG. 2.

Referring now to FIG. 3, elements the same or substantially the same as those in the embodiments of FIGS. 1 or 2 retain the same reference character, but superseded by the numeral 2. The embodiment of FIG. 3 is substantially the same as the embodiment of FIG. 2, except that the valve member 184 and solenoid actuator 182 have been replaced by a switching valve generally indicated by the numeral 286. The switching valve 286 includes a pair of check valves 288, 290 which are mounted on a valve stem 292 and which are biased apart by a spring 294 toward stops (not shown) carried on the stem 292. The valve stem 292 is connected to a wave washer 296 which divides chamber 298 within the housing 222 into sections 298A and 298B, which are communicated to branches 270, 272 respectively. The stem 292 extends through a seal 300, the periphery of which is sealingly attached to the walls of the housing 222. The wave washer 296 is a snap-action resilient washer movable between a first stable position maintaining the valve 288 in sealing engagement with the branch 278 to a second position opening the branch 278 and sealingly engaging the valve 290 with the branch 280. The snap-action washer remains in the first or second stable position respectively even after the vehicle engine is turned off thereby permitting pressures in the chambers 298A and 298B to reduce to nominal pressure. In this way, the small amount of fuel in the return lines is never communicated to the wrong tank when the vehicle engine is turned off and then restarted.

Figure 4:
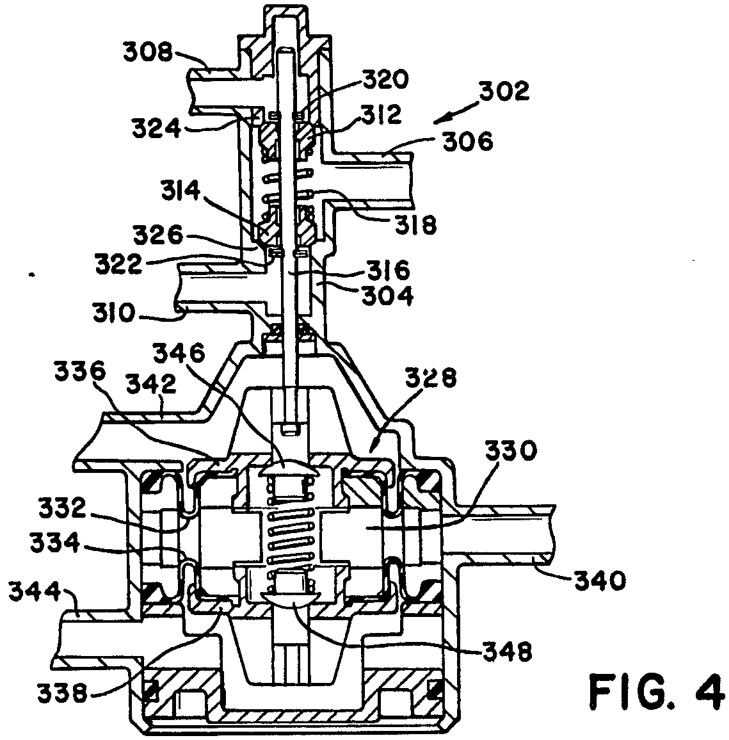
FIG. 4 is a cross-sectional view of still another alternate embodiment of a fuel control valve usable in the systems of FIGS. 2 and 3.

Referring now to FIG. 4, a valve mechanism which can be used in lieu of the switching valve 286 of FIG. 3 is illustrated in detail. Valve mechanism generally indicated by the numeral 302 includes a housing 304 having an inlet port 306 communicated with the portion 236 of the return circuit 218, an outlet port 308 communicated with branch 278 of the return circuit 218, and another outlet port 310 communicated with branch 280 of the return circuit 218. A pair of valve elements 312, 314 are mounted slidably on a valve stem 316 and are urged by a spring 318 toward stops 320, 322 respectively. The valve elements 312, 314 are adapted to engage and disengage with corresponding valve seats 324, 326 to control communication through the ports 308, 310. Accordingly, when the stem 316 is disposed in the position illustrated, the spring 318 biases both of the valve elements 312, 314 into sealing engagement with their corresponding valve seats 324, 316 so that communication from the inlet port 306 to either of the outlet ports 308, 310 is prevented. When the stem 316 is moved downwardly viewing the Figure, engagement of the stop 320 with the valve member 312 urges the latter away from the valve seat 324 upon downward movement of the stem 316 from the position illustrated, thereby permitting communication from inlet port 306 to outlet port 308 while maintaining outlet port 310 closed. On the other hand, upon upward movement of the valve stem 316 from the position illustrated in the drawing, the valve member 314 is engaged by the corresponding stop 322 to urge the valve member 314 away from the valve seat 326, thereby permitting uninhibited communication from the inlet port 306 to the outlet port 310 while preventing communication to the outlet port 308.

Movement of the valve stem 316 is effected by a piston generally indicated by the numeral 328 which is connected to the valve stem 316. A cavity 330 is defined within the piston 328, and a pair of axially-separated diaphragms 332, 334 connect opposite fluid pressure responsive faces 336, 338 with corresponding portions of the wall of the housing 304. An outlet port 340 is communicated to the portion 228 of the fuel supply or primary circuit 116 or 216 and also communicates with the compartment defined by the cavity 330. Fluid pressure responsive face 336 of piston 328 cooperates with the wall of the housing 304 to define a compartment which is communicated with an inlet port 342 which is communicated with the branch 270, 170 of the fuel supply circuit 116, 216. The opposite face 338 of the piston 328 cooperates with the wall of the housing 304 to define a cavity which is communicated with inlet port 344 which is in turn communicated with the branch 272, 172 of the fuel supply or primary circuit 116, 216. A pair of oppositely-acting check valves 346, 348 are carried in the piston 328 and cooperate to selectively admit the higher of the fluid pressure levels at the inlet ports 342 or 344 into the cavity 330 defined within the piston 328.

Since pressure will be communicated to the inlet ports 342 or 344 only from the branch 170, 270 or 172, 272 which communicates with the tank whose pump is being operated, only fuel from the tank in which the pump is operating will be communicated into the cavity 330. This fluid pressure level also acts on one of the opposite fluid pressure responsive faces 336, 338 to shift the piston 328 upwardly or downwardly viewing FIG. 4. Movement of piston 328 upwardly or downwardly is transmitted to valve members 312, 314 by the valve stem 316, to thereby communicate the inlet port 306 to the outlet 308 or 310 which is communicated to the fuel tank from which fuel is being taken.

I claim:

1. Valve mechanism for a fluid system having a pair of tanks, a primary circuit having a pair of branches communicated with a corresponding one of said tanks and a return system having a pair of branches for returning fluid to said tanks, said valve mechanism being responsive to communication of fluid through the branches of the primary circuit to communicate fluid in the return circuit to the tank from which fluid is being taken by the primary circuit, said valve mechanism including a housing having a pair of inlets communicated respectively with the branches of the primary system, an outlet communicated to the primary circuit, an inlet communicated to the return circuit, a pair of outlets communicated respectively with the branches of the return circuit, valve means for controlling communication between said inlet communicated to the return circuit and said pair of outlets communicated to the branches of the return circuit, and valve operating means for controlling said valve means, said valve operating means including a pressure differential responsive means responsive to the pressure differential between the inlets communicated with the branches of the primary circuit to shift the valve means from a first position communicating the inlet communicated with the return circuit with one of said outlets communicated with the return circuit, said valve operating means shifting said valve means to a second position communicating said last-mentioned inlet with the other of said outlets communicated to said return circuit.

2. Valve mechanism as claimed in claim 1, wherein said valve operating means includes a snap-action resilient washer movable between first and second stable conditions yieldably maintaining said valve means in said first or second positions.

3. Valve mechanism as claimed in claim 2, wherein said valve operating means includes a stem connecting with said valve means, said stem being attached to said washer.

4. Valve mechanism as claimed in claim 1, wherein said fluid system is the fuel supply system for an engine, said valve means including valve members controlling communication in said branches communicated with said tanks, said valve members closing said branches communicated with said tanks when the engine is shut down.

5. Valve mechanism as claimed in claim 1, wherein said valve means includes valve members controlling communication into the branches of the return system communicated to said tanks, said valve members including means for closing each of said valve members before opening of the other valve member when fluid in the return circuit is switched from one branch to the other.

6. Valve mechanism as claimed in claim 1, wherein said pressure differential responsive means is a piston slidably mounted in said housing and having opposed fluid pressure faces, each of said branches of said primary circuit communicating with a corresponding one of said fluid pressure responsive faces.

7. Valve mechanism as claimed in claim 6, wherein a chamber is defined within said piston and moves therewith, first and second passage means communicating said chamber with the fluid pressure levels at said opposed fluid pressure faces, check valve means in said first and second passage means for selecting the higher of the fluid pressure levels communicated to said faces of said piston, and third passage means communicating said chamber to said outlet communicated with said primary circuit.

8. Valve mechanism as claimed in claim 7, wherein said piston includes a pair of flexible diaphragms connecting the piston with the wall of said housing, said diaphragms cooperating with the wall of the housing and with said piston to define portion of said chamber, said outlet port communicated in the primary circuit also communicating with said portion of the chamber.

9. Valve mechanism for a fluid system comprising three inlets and three outlets, first valve means responsive to the fluid pressure level at two of said inlets for controlling communication between one of the latter and a corresponding one of said outlets, second valve means controlling communication between the third inlet and the other outlets, and valve operating means for moving said second valve means between a first position communicating said third inlet with one of said other outlets to a second position communicating said third inlet to the other of said other outlets, said valve operating means including pressure differential responsive means responsive to the fluid pressure levels at said two inlets to move said second valve means in response thereto and a snap-action resilient washer movable betweeen first and second stable positions in response to movement of said valve operating means to yieldably maintain the latter in said first or second positions.

* * * * *